(12) United States Patent
Harris et al.

(10) Patent No.: US 11,041,956 B2
(45) Date of Patent: Jun. 22, 2021

(54) LIDAR MODULE AND PORTABLE LIDAR SCANNER UNIT

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 491 days.

(21) Appl. No.: 15/988,685

(22) Filed: May 24, 2018

(65) Prior Publication Data

US 2019/0361094 A1 Nov. 28, 2019

(51) Int. Cl.
*G01C 3/08* (2006.01)
*G01S 17/89* (2020.01)
*G01S 7/481* (2006.01)
*G01S 17/931* (2020.01)

(52) U.S. Cl.
CPC ............ *G01S 17/89* (2013.01); *G01S 7/4813* (2013.01); *G01S 17/931* (2020.01)

(58) Field of Classification Search
CPC ........ G01S 17/87; G01S 17/931; G01S 17/89; G01S 7/4817; G01S 7/4813
USPC ...................................................... 356/5.01
See application file for complete search history.

(56) References Cited

U.S. PATENT DOCUMENTS

| | | | |
|---|---|---|---|
| 10,094,916 B1 * | 10/2018 | Droz | G01S 17/89 |
| 10,255,670 B1 * | 4/2019 | Wu | H04N 7/183 |
| 10,330,483 B2 * | 6/2019 | Anderson | G05D 1/0214 |
| 10,488,494 B2 * | 11/2019 | Nichols | G01S 17/931 |
| 2008/0011554 A1 | 1/2008 | Broesel et al. | |
| 2010/0063736 A1 | 3/2010 | Hoetzer | |
| 2013/0033381 A1 | 2/2013 | Breed | |
| 2015/0066349 A1 | 3/2015 | Chan et al. | |

FOREIGN PATENT DOCUMENTS

| | | | | |
|---|---|---|---|---|
| DE | 102014005350 A1 | 10/2015 | | |
| EP | 1834922 A2 | 9/2007 | | |
| WO | 2017177205 A1 | 10/2017 | | |
| WO | WO-2017177206 A1 * | 10/2017 | ........... | G01S 17/931 |
| WO | 2017221228 A2 | 12/2017 | | |

* cited by examiner

*Primary Examiner* — Mark Hellner
(74) *Attorney, Agent, or Firm* — Christopher G. Darrow; Darrow Mustafa PC

(57) ABSTRACT

A lidar module configured for mounting on a vehicle is provided. The lidar module may include a module housing structured to be securable to a vehicle. The module housing may define a cavity configured for receiving a lidar scanner unit therein. The lidar module may include a lidar scanner unit configured to be received within the module housing cavity. The lidar scanner unit may be configured to be removable from the module housing cavity whenever the lidar scanner unit is not in use.

17 Claims, 10 Drawing Sheets

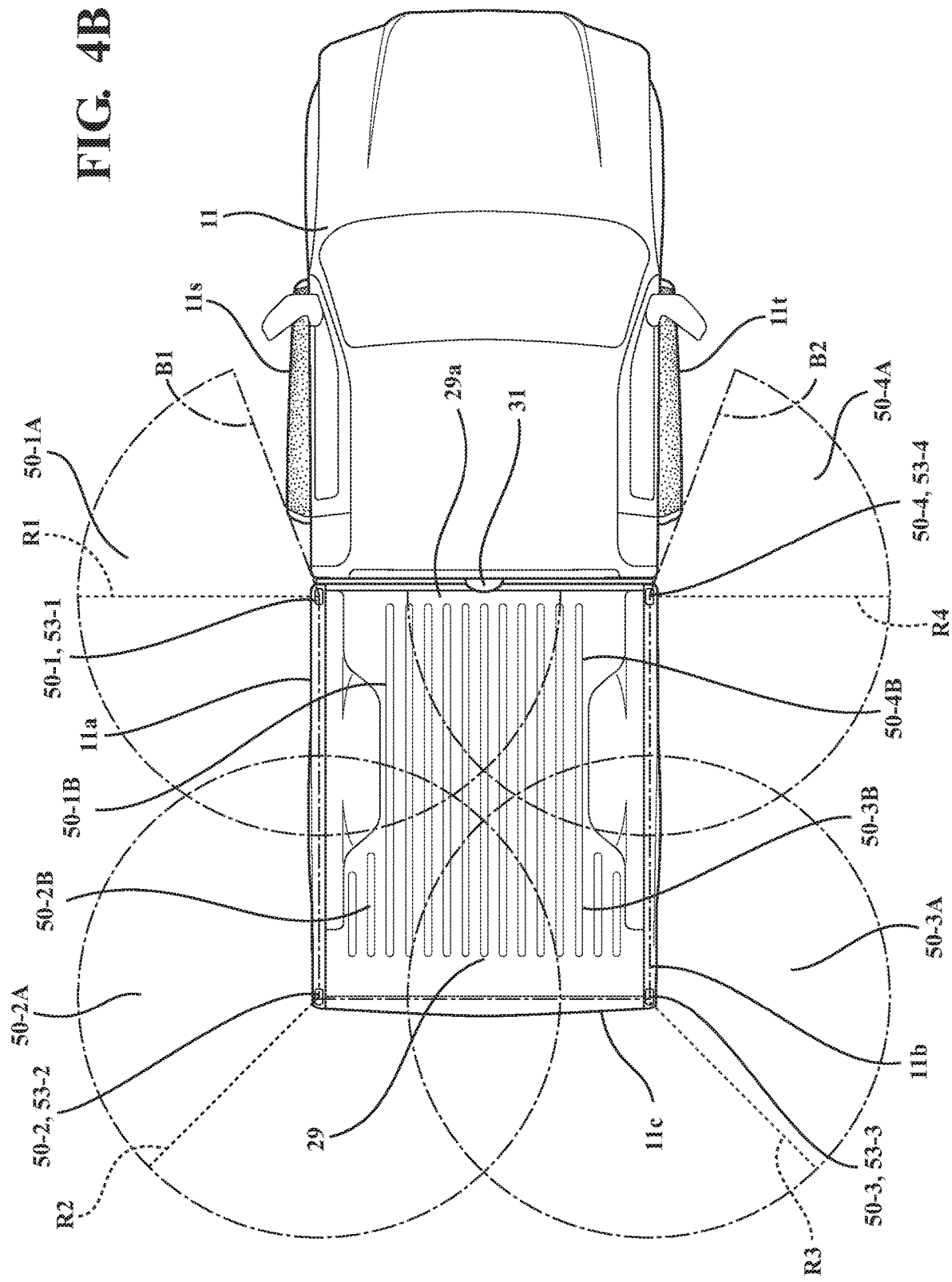

LIDAR MODULE AND PORTABLE LIDAR SCANNER UNIT

TECHNICAL FIELD

The present disclosure relates to vehicle sensors and, more particularly, to a lidar module including a lidar scanner unit which may be mounted on (and detached from) a vehicle, and which may be incorporated into an existing sensor array of a vehicle.

BACKGROUND

Cargo residing in vehicle cargo spaces may move undesirably during motion of the vehicle. Also, cargo residing in cargo spaces which are exposed or uncovered may be vulnerable to theft when the vehicle is stationary or unattended. Thus, a user may wish to monitor cargo in cargo spaces (especially exposed or visible cargo spaces) for undesirable shifting or removal when the vehicle is moving or unattended.

SUMMARY OF THE INVENTION

In one aspect of the embodiments described herein, a lidar module is provided. The lidar module is configured for mounting on a vehicle. The lidar module may include a module housing structured to be securable to a vehicle. The module housing may define a cavity configured for receiving a lidar scanner unit therein. The lidar module may include a lidar scanner unit configured to be received within the module housing cavity. The lidar scanner unit may be configured to be removable from the module housing cavity whenever the lidar scanner unit is not in use.

In another aspect of the embodiments described herein, a lidar scanner unit configured for mounting on a vehicle is provided. The lidar scanner unit may be configured to be operable to generate a lidar image in any of a first scanning mode, a second scanning mode, and a third scanning mode when the lidar scanner is mounted on the vehicle. The lidar scanner unit may be operable to generate a lidar image of only at least a portion of a cargo space of the vehicle in the first scanning mode. The lidar scanner unit may be operable to generate a lidar image of only a volume of space exterior of the vehicle in the second scanning mode. The lidar scanner unit may be operable to generate lidar images of both the at least a portion of the cargo space of the vehicle and the volume of space exterior of the vehicle in the third scanning mode.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 4B is a schematic plan view of the vehicle shown in FIG. 4A, showing scanner fields of view of the lidar modules, in accordance an embodiment described herein.

DETAILED DESCRIPTION

Embodiments described herein relate to a lidar module configured for mounting on a vehicle. The lidar module may include a module housing structured to be securable to the vehicle. The module housing may define a cavity configured for receiving a lidar scanner unit therein. The lidar module may also include a lidar scanner unit configured to be received within the module housing cavity. The scanner unit may be configured to be removable from the module housing cavity whenever the lidar scanner unit is not in use and when the vehicle is not in use. The lidar module may be structured so that the lidar scanner unit is movable within the module housing cavity, between deployed and retracted positions. In the retracted position, the lidar scanner unit is stowed within the lidar module housing for aesthetic reasons and to protect the lidar scanner unit from theft. In the deployed position, the lidar scanner unit is operable to scan regions around the scanning unit and to generate a lidar scan image in any of a first scanning mode, a second scanning mode, and a third scanning mode. In the first scanning mode, the lidar scanner unit is operable to generate a lidar image of a portion of a cargo space of the vehicle. In the second scanning mode, the lidar scanner unit is operable to generate a lidar image of a predetermined volume of space exterior of the vehicle. In the third scanning mode, the lidar scanner unit is operable to generate lidar images of both the portion of the cargo space of the vehicle and the predetermined volume of space exterior of the vehicle.

Figure 1:
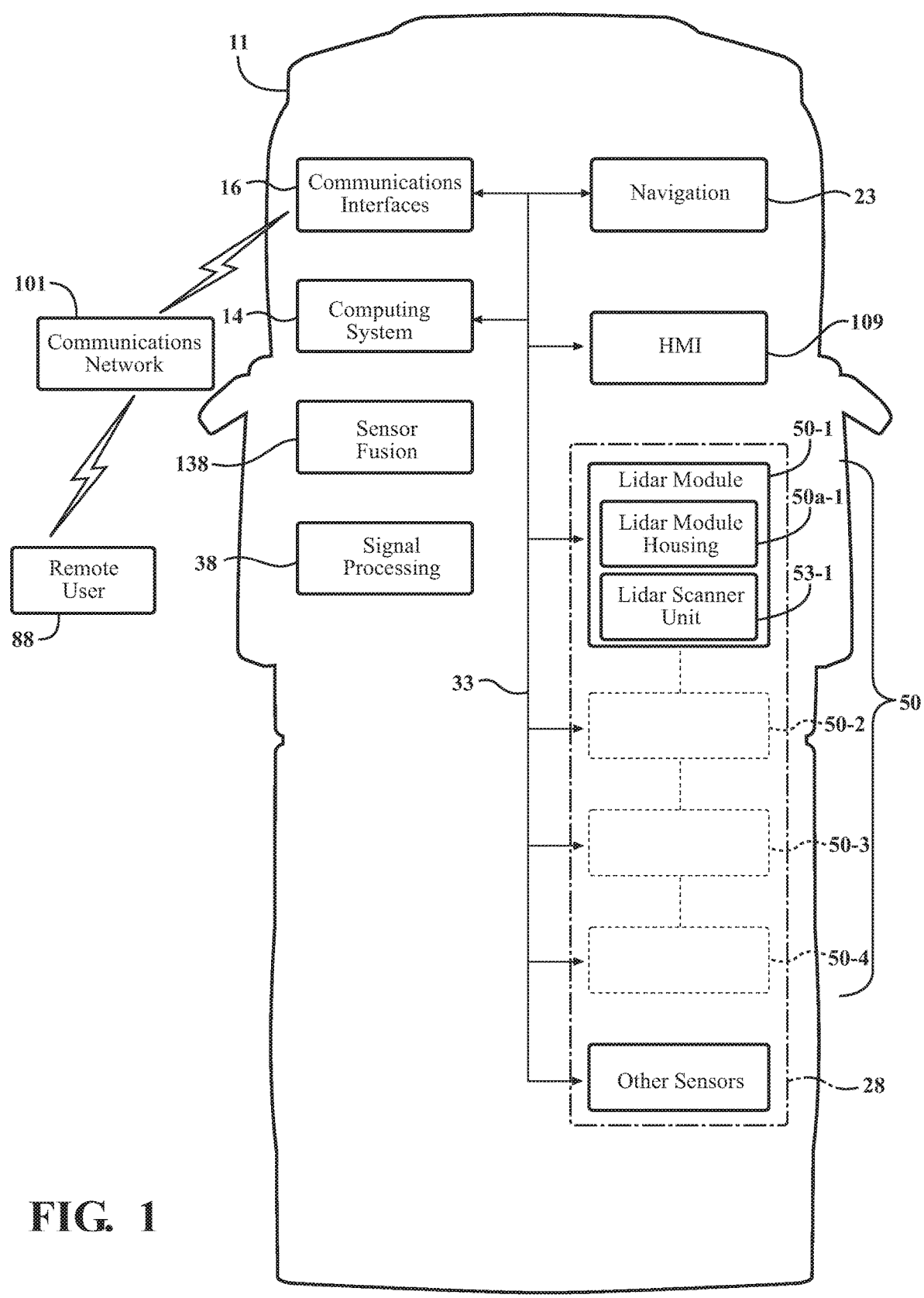
FIG. 1 is a schematic block diagram of a vehicle configured for incorporating one or more lidar modules, in accordance with embodiments described herein.

FIG. 1 is a schematic block diagram of a vehicle 11 configured for incorporating one or more lidar modules, in accordance with embodiments described herein. The vehicle 11 may take the form of a car, truck, or any other vehicle incorporating one or more vehicle cargo spaces usable for holding and transporting items of cargo. The vehicle 11 may be configured for manual or autonomous operation, and may operate in a fully or partially autonomous mode. While in an autonomous mode, the vehicle 11 may be configured to operate without human interaction. The vehicle 11 may be configured for completely autonomous driving operations (i.e., for self-driving, without the presence of a driver or driver input) from a start location to a given destination along a route determined by a navigation unit or system 23, using a self-driving capability 69, for example. Alternatively, the vehicle 11 may be configured for semi-autonomous driving operations (i.e., with some human involvement in specific situations) using autonomous driving assistance capabilities 62 such as lane-keeping, adaptive cruise control (ACC), and/or other capabilities. In addition, some or all aspects of the vehicle 11 may be operated manually, in a conventional manner.

The vehicle 11 may include various systems, subsystems and components in operative communication with each other, such as a sensor system or array 28, a computing system 14, one or more communications interfaces 16, and other systems and components needed for operating the vehicle as described herein. The vehicle 11 may include more or fewer subsystems than those shown in FIG. 1, and each subsystem could include multiple elements. Further, each of the subsystems and elements of vehicle 11 may be interconnected. Performance of one or more of the described functions of the vehicle 11 may be executed by multiple vehicle systems and/or components operating in conjunction with each other. The various vehicle systems may be controlled by (or may otherwise interact with) the computing system 14. Additional controls, systems and/or capabilities may be provided if needed to perform the functions described herein, depending on the design of a particular vehicle. Vehicle embodiments described herein are assumed to include sufficient elements, systems and/or capabilities to autonomously execute all of the commands needed to perform the various data processing and control operations described herein. The various system and component capabilities described herein may be implemented in software, hardware, or in a suitably configured combination of hardware and software.

Figure 2:
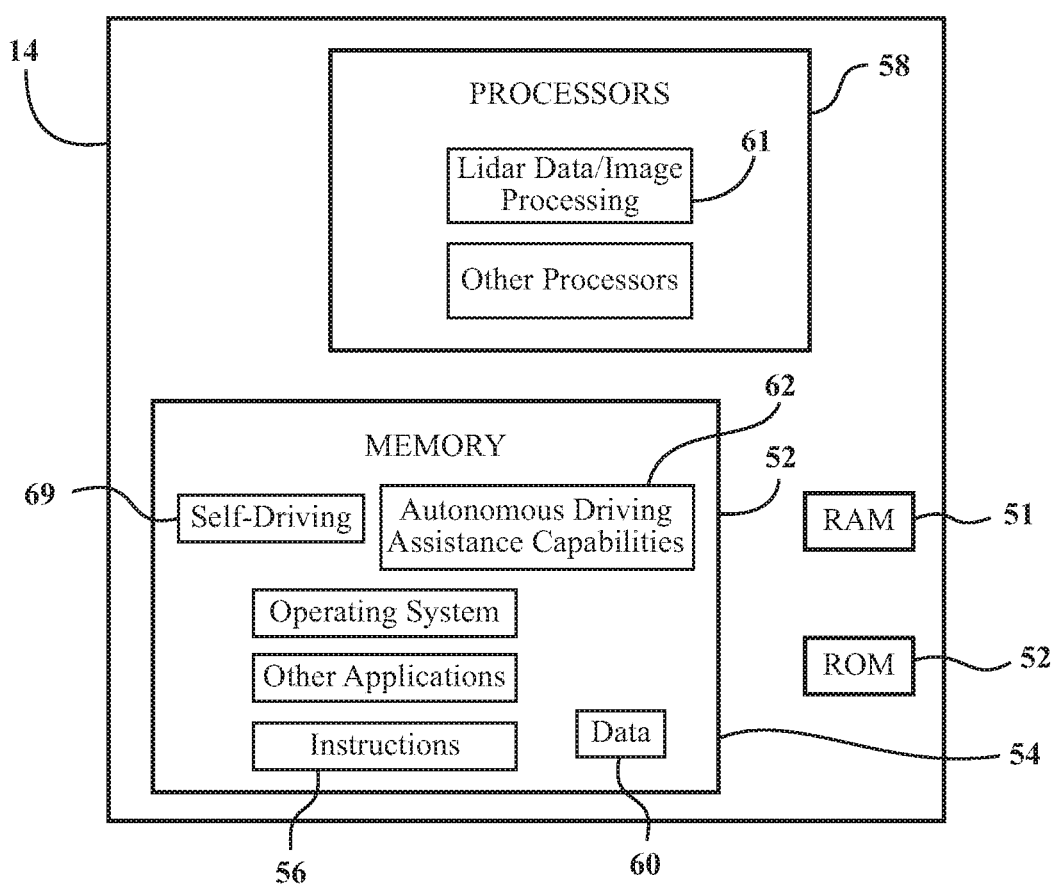
FIG. 2 is a schematic block diagram of a vehicle computing system that may be used according to one or more illustrative embodiments of the disclosure.

FIG. 2 is a block diagram of a vehicle computing system 14 that may be used according to one or more illustrative embodiments of the disclosure. The computing system 14 may be operatively connected to the other vehicle systems and elements and otherwise configured so as to affect partial or fully autonomous control and operation of the vehicle 11 and/or its components and subsystems as described herein. The computing system 14 may control the functioning of the vehicle 11 based on inputs and/or information received from various subsystems (e.g., sensor system 28, etc.), from any of the communications interfaces 16, and/or from any other suitable source of information. The computing system 14 may have some or all of the elements shown in FIG. 2. In addition, the computing system 14 may also include additional components as needed or desired for particular applications.

The computing system 14 may include one or more processors 58 for controlling overall operation of the computing system 14 and its associated components, including RAM 51, ROM 52, other computer-readable storage or memory 54, and any other elements. The computing system 14 may include (or be communicatively coupled to) an input/output module or human-machine interface (HMI) 109 (FIG. 1). Computing system 14 may control operations of the vehicle HMI 109. Computing system 14 may execute instructions stored in a non-transitory computer readable medium, such as memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, controllers, microcontrollers, DSP processors, and other circuitry that can execute software. In the context of this document, a computer-readable storage medium may be any tangible medium that can contain or store a program for use by or in connection with an instruction execution system, apparatus, or device. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. The computing system 14, along with any additional computing systems (e.g., any specialized primary sub-system controllers) (not shown) and other devices may correspond to any of multiple systems or devices configured as described herein for functions such as autonomously or semi-autonomously operating the entire vehicle or specific portions of the vehicle.

Computing system 14 may also be configured to receive and store information from the sensor array 28 and/or from any other vehicle components pertaining to operation of the vehicle. The computing system 14 may also be configured to receive and store the information so that all of the information is time-correlated and may be processed for diagnostic purposes.

The memory 54 may comprise one or more computer-readable memories. A computer-readable storage or memory 54 may include any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media may include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

The memory 54 may contain data 60 and/or instructions 56 (e.g., program logic) executable by the processor(s) 58 to execute various functions of the vehicle 11. The memory 54 may contain additional instructions as well, including instructions to transmit data to, receive data from, interact with, or control one or more of the vehicle systems and/or components described herein (for example, sensor system 28 and communication interfaces 16). In addition to the instructions 56, the memory 54 may store data such as roadway maps, path information, among other information. Such information may be used by the vehicle 11 and the computing system 14 and/or a navigation system 23 for route planning and otherwise during the operation of the vehicle 11 in autonomous, semi-autonomous, and/or manual modes.

Computing system 14 may include processors and/or software embodying a lidar data/image processing capability 61, which may enable and/or facilitate receiving and processing lidar data and/or lidar images from lidar modules 50. Lidar data/image processing capability 61 may also enable computing system 14 to generate lidar images from lidar data received from the lidar modules 50 and from other lidar sensors. Lidar data/image processing capability 61 may also enable computing system 14 to perform any processing of lidar images and/or data required for the various control operations, alert generation, image comparison and/or other functions for which lidar information may be employed, depending on the particular vehicle configuration. The computing system 14 may also incorporate a comparator capability, to enable comparison between successive lidar images of the same field(s) of view. This may enable the computing system 14 to detect differences in lidar images or profiles occurring between successive lidar images from the same lidar scanner. Such differences may indicate undesirable movement or shifting of cargo, or even removal of cargo.

Vehicle computing system 14 may operate (via vehicle communications interfaces 16) in a networked environment supporting connections to one or more remote computers, such as other computing systems, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with vehicle computing system 14 may include devices installed in vehicles, mobile devices that may travel within vehicles, or devices outside of vehicles that are configured to receive and process vehicle and driving data. Thus, any terminals or devices in communication with the computing system 14 may each include personal computers (e.g., laptop, desktop, or tablet computers), servers (e.g., web servers, database servers, etc.), user mobile devices (such as cellular phones) and other terminals or devices.

Figure 4A:
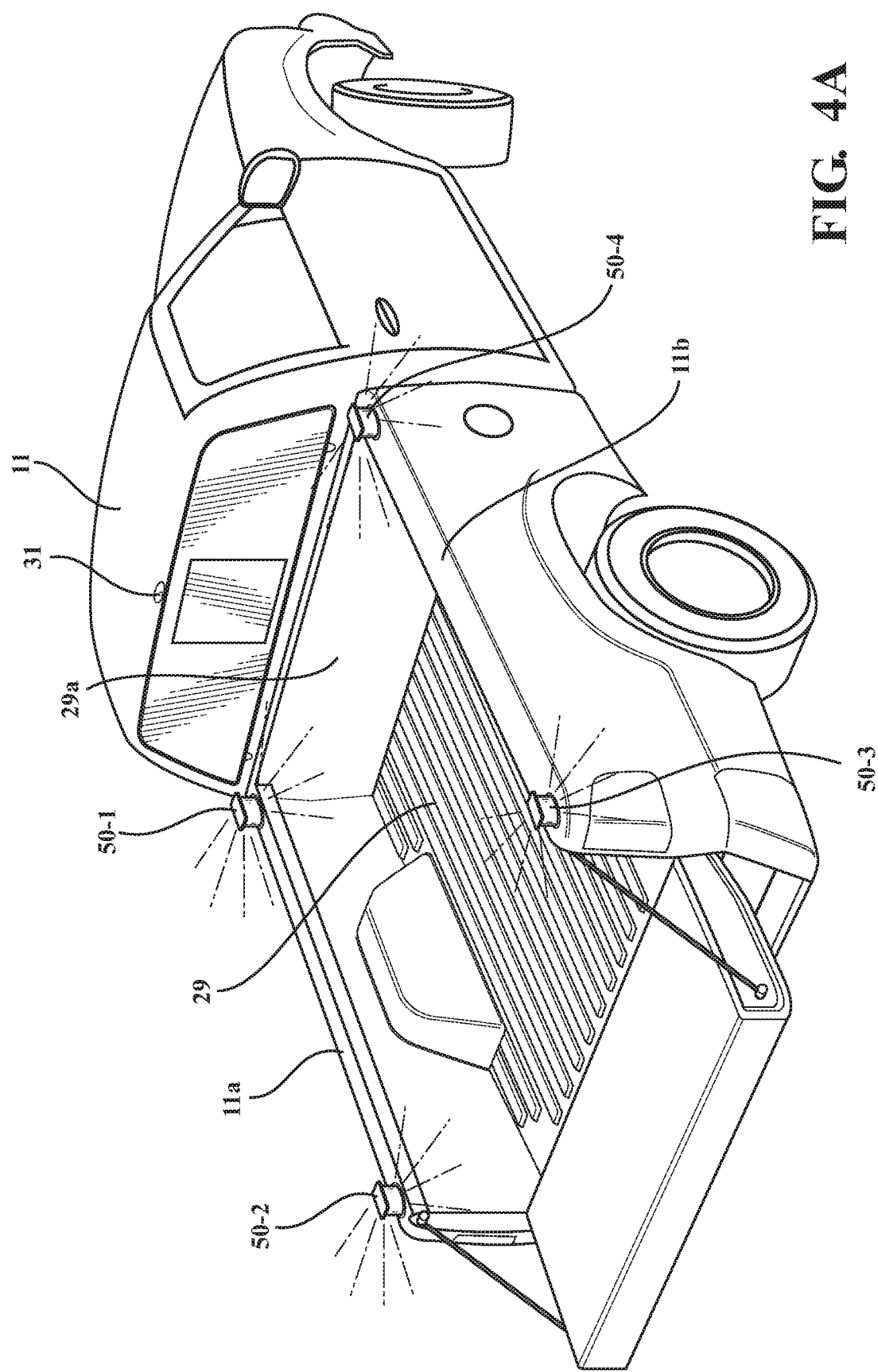
FIG. 4A is a schematic perspective view showing an example of an arrangement of lidar modules on a vehicle, in accordance an embodiment described herein.

The computing system 14 may be configured to trigger an alert responsive to disturbances (such as shifting or removal) of cargo. An alert may be triggered for example, responsive to a determination by computing system that cargo being monitored by a lidar scanner has moved at least a predetermined amount between successive lidar scans. The alert may be transmitted to the HMI 109 for alerting a user inside the vehicle 11, or the alert may be transmitted to a remote user or entity using communications interfaces 16. A CHMSL or other camera 31 (for example, as shown in FIG. 4A) configured to monitor a vehicle cargo space (such as cargo space 29 in the drawings) may be configured to be controllable by the computing system 14 to automatically activate if cargo in the camera's field of view is disturbed. An image provided by the camera may be transmitted to the HMI 109, or the image may be transmitted to a remotely located user, for example, when the vehicle is parked. Alternatively, in one or more arrangements, the camera may be manually activatable and controllable through a cellular or other mobile interface by a remotely-located user responsive to alert signal transmitted to the user by computing system 14 via communications interface 16, or responsive to an alert signal transmitted to the user via a communications interface 50e-2 located in an associated lidar scanner unit 53, as described herein.

HMI 109 may be an in-vehicle HMI including elements located in the occupant compartment and hard-wired to the vehicle computing system. The HMI 109 may include elements such as a display, keypad, microphones and speakers for voice-recognition and communication with the vehicle computing system 14, and any other suitable elements. The HMI 109 may also (or alternatively) include hardware and software elements enabling communications between computing system 14 and a user using a cellular phone or other personal communications device. The HMI 109 may be in any form and incorporate any elements and/or systems directed to facilitating communications between a user and the vehicle computing system 14 which controls one or more operations of the vehicle. HMI 109 may be configured to enable a vehicle operator to select and control operational aspects of the lidar scanning modules 50 described herein. For example, lidar module scanning modes and/or operational modes as described herein may be selected by the user and saved for various situations using HMI 109 or another user interface (for example, a cellular or mobile interface).

Vehicle communications interfaces 16 may be configured to establish and enable continued and uninterrupted interaction between the vehicle 11 and external sensors, other vehicles, other computer systems, various external computing and communications systems and networks (such as communication network 101, a satellite system, a cellular phone/wireless communication system), and also remote users or entities, to enable and/or facilitate performance one or more of the functions described herein. The communications interfaces 16 may include interfaces enabling communication in a wide area network (WAN), a wireless telecommunications network, and/or any other suitable communications networks (such as or including communications network(s) 101, for example). The communication network(s) 101 can include wired communication links and/or wireless communication links. The communication network(s) can include any combination of the above networks and/or other types of networks. The communication network(s) can include one or more routers, switches, access points, wireless access points, and/or the like.

When used in a WAN networking environment, the vehicle computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing systems (not shown) via one or more network devices (e.g., base transceiver stations) in the wireless network. These configurations provide various ways of receiving a constant flow of information from (and transmitting a constant flow of information to) various external sources. The communications interfaces 16 may be incorporated into the computing system 14 or may be located spaced apart from the computing system and communicatively coupled to the computing system.

In one or more arrangements, the communications interfaces 16 may be configured to enable and/or facilitate communications between the computing system 14 and a remotely located user (for example, via cellular or other portable device communications modes) via communications network 101. The communications interfaces 16 may be configured to enable control of aspects of the vehicle (including lidar modules 50) by the remote user. For example, scanning modes and operating modes of the lidar sensors 50 may be selected remotely by users via the communications interfaces 16.

Figure 3:
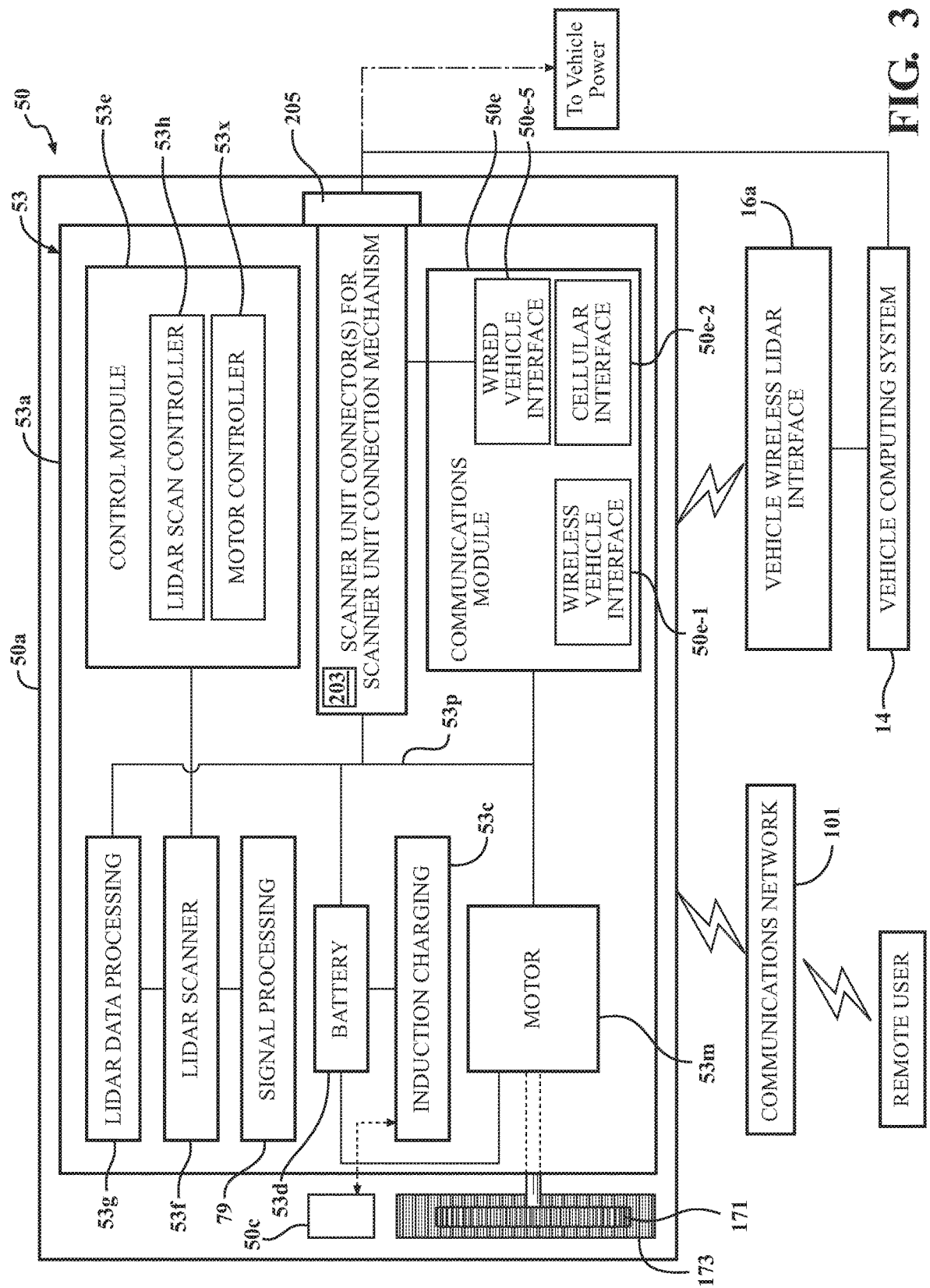
FIG. 3 is a schematic block diagram of an exemplary lidar module in accordance with an embodiment described herein.

Vehicle communications interfaces 16 may include wireless communications interfaces configured to enable vehicle computing system 14 to wirelessly communicate with entities (such as remotely located users) exterior of the vehicle 11. Vehicle communications interfaces 16 may also include wireless communications interfaces configured to enable vehicle computing system 14 to wirelessly communicate with lidar scanner units 53, for example, via vehicle wireless interface 50e-1 (FIG. 3). Vehicle communications interfaces 16 may also include a wired communications interface 50-e4 configured to enable wired communications between vehicle computing system 14 and lidar scanner units 53 (for example, using a lidar scanner unit connection mechanism as described herein).

Referring again to FIG. 1, vehicle 11 may include an array 28 of vehicle sensors designed to monitor various vehicle operational status parameters and environmental conditions external to the vehicle. In a known manner, the vehicle sensors provide data used by the vehicle computing system 14 in formulating and executing suitable control commands in vehicle elements and sub-systems, and also for other purposes. Examples of sensors that may be incorporated into a vehicle sensor array include radar and lidar systems (including lidar modules 50 described herein), vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

External cameras and proximity sensors, radar, lidar and other types of sensors may detect other nearby vehicles, traffic levels, road conditions, traffic obstructions, animals, cyclists, pedestrians, and other conditions that may factor into a driving event data analysis. Vehicle sensors 28 also may include cameras and/or proximity sensors capable of recording additional conditions inside or outside of the vehicle. For example, the vehicle may incorporate a CHMSL camera 31 configured to monitor the vehicle cargo space. Other cameras may be usable to determine the route, lane position, and other vehicle position/location data. The camera(s) may be still cameras or video cameras. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

If a processor or computing system 14 is configured to process an integrated or composite signal formed from outputs of multiple individual sensors, the vehicle 11 may incorporate a known sensor fusion means 138 (incorporating, for example, a suitable Kalman filter and/or another element incorporating or embodying a suitable sensor fusion algorithm) in communication with other pertinent vehicle systems, such as computing system 14, sensor system 28, and other vehicle systems. The sensor fusion means 138 may process data received from the various vehicle sensors to generate an integrated or composite signal (formed, for example, from outputs of multiple individual sensors) usable by a processor or computing system 14. The sensor fusion means 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are also possible. The sensor fusion means 138 may be stored on a memory (such as memory 54) incorporated into or in operative communication with computing system 14, and may be operated by the computing system in a manner known in the art.

If a sensor output signal may require processing prior to use by a processor or computing system 14, or if operation of any actuatable sub-system components or other vehicle components (for example, components of a steering system or throttle system) may require processing of a control signal received from a processor or computing system 14, a known signal processing means 38 may be provided in communication with other pertinent vehicle systems, such as computing system 14, sensor system 28, and other vehicle systems.

The vehicle 11 may be configured so that the computing system 14, sensors 28 and other elements of the system can communicate with each other using a controller area network (CAN) bus 33 (FIG. 1) or the like. Via the CAN bus and/or other wired or wireless mechanisms, the computing system 14 may transmit messages to various devices in the vehicle and/or receive messages from the various devices, e.g., controllers, actuators, sensors, etc. Alternatively, any of the elements and/or systems described herein may be directly connected to each other without the use of a bus. Also, connections between the elements and/or systems described herein may be through another physical medium (such as wired connections), or the connections may be wireless connections.

Referring to the drawings, the vehicle 11 may be configured to enable installation of, and facilitate operation of, one or more lidar modules, collectively designated 50. Lidar modules 50 may be configured and mountable to the vehicle 11 so as to enable the modules to be integrated into the vehicle sensor system 28 when the modules are mounted in the vehicle.

Figure 5A:
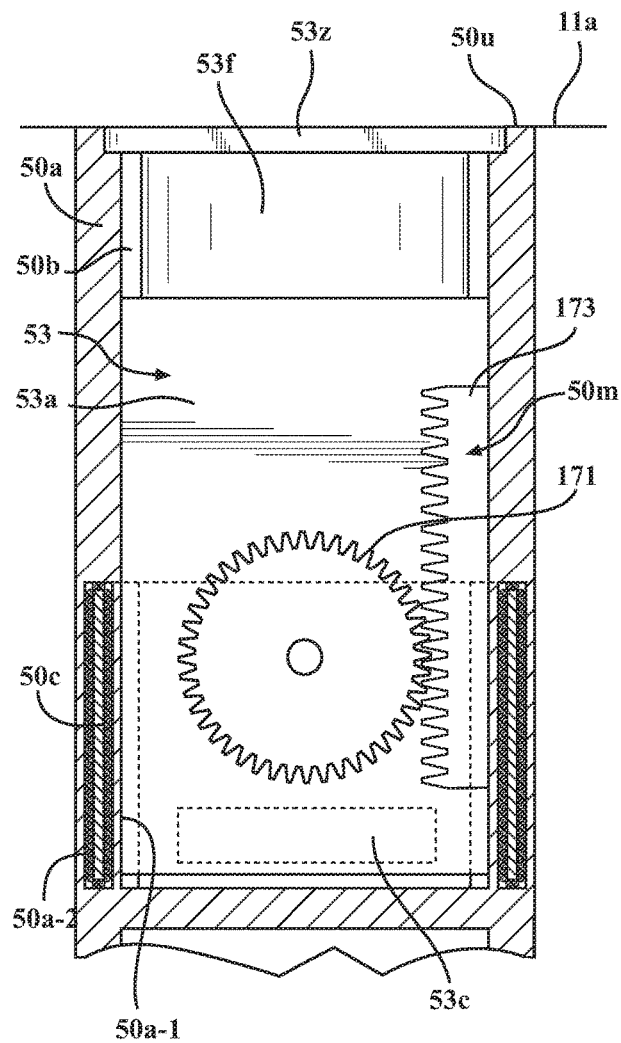
FIG. 5A is a schematic front cross-sectional view of a lidar module in accordance with an embodiment described herein, mounted in a vehicle and with the lidar scanner unit shown in a retracted position.
Figure 5B:
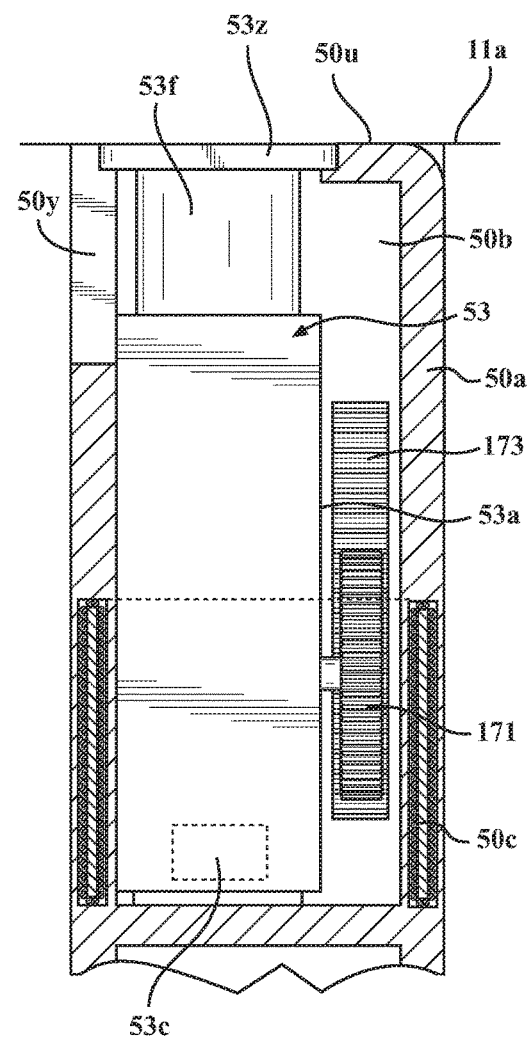
FIG. 5B is a schematic side cross-sectional view of the lidar module embodiment shown in FIG. 5A.

FIG. 3 is a schematic block diagram of an exemplary lidar module 50 in accordance with an embodiment described herein. FIG. 5A is a schematic cross-sectional front view of a lidar module 50 in accordance with an embodiment described herein, mounted in a vehicle. FIG. 5B is a schematic cross-sectional side view of the lidar module embodiment shown in FIG. 5A. FIGS. 5A and 5B show the lidar scanner unit 53 in a retracted position within the housing.

In one or more arrangements, lidar module 50 may include a module housing 50a structured to be securable to the vehicle 11. The housing 50a may define a cavity 50b (FIGS. 5A-5C) configured for receiving an associated lidar scanner unit 53 therein. The module housing 50a may also be structured to be removable from the vehicle. The module housing 50a may also be structured for permanent or semi-permanent securement to the vehicle 11.

In one or more arrangements, the module housing 50a may have outer dimensions selected to enable the module housing to be inserted into a stake pocket of a pickup truck or similar vehicle. FIGS. 4A and 4B show a possible arrangement of several lidar modules 50 in stake pockets in a vehicle 11 in the form of a pickup truck. The embodiment shown includes four lidar modules 50-1, 50-2, 50-3, and 50-4 disposed in associated stake pockets in walls 11a, 11b surrounding a cargo space 29 of the vehicle 11. The module housing outer dimensions may be tailored to the dimensions of the stake pockets of a particular make and model of vehicle, so as to provide a desired fit of the housing inside the stake pocket. The housing cavity configuration may be standardized, allowing the lidar scanner unit housings to be received in the module housing to have the same outer dimensions. Thus, the module housing 50a may serve an "adapter"-type function, allowing standardized lidar scanner units 53 to be positioned in stake pockets of various sizes. The module housing may be secured to the vehicle and/or within the vehicle stake pockets using any suitable method, for example, mechanical fasteners or a snap-in feature molded into the module housing.

Figure 5C:
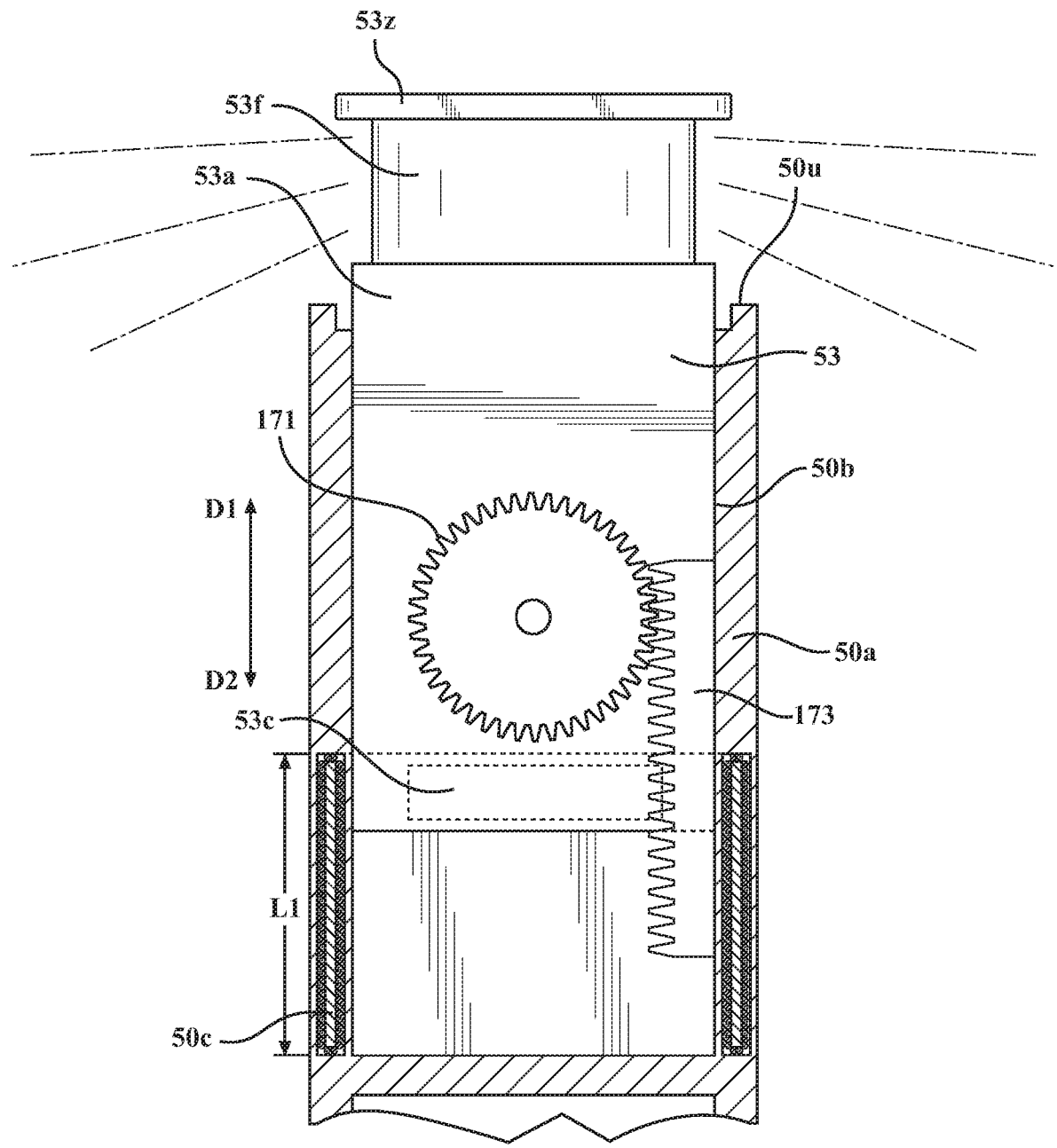
FIG. 5C is the schematic front cross-sectional view of FIG. 5A showing the lidar scanner unit in a deployed or scanning position.

Referring again to FIGS. 3 and 5A-5C, module housing 50a may have an induction charging apparatus 50c positioned therein to interface with a complementary induction charging apparatus 53c connected to a battery 53d in the lidar scanner unit 53, thereby enabling induction charging of the lidar scanner unit battery 53d. In one or more arrangements, the module housing induction charging apparatus 50c may be configured to extend over a length L1 of the housing (as shown in FIG. 5C), such that continuous charging of the battery 53d may be performed regardless of the position of the battery as the lidar scanner unit 53 moves along the housing cavity.

The module housing induction charging apparatus 50c may be embedded, for example, between an inner wall surface 50a-1 (FIG. 5A) of the housing and an outer wall surface 50a-2 of the housing 50a. The module housing induction charging apparatus 50c may include an induction coil extending around a bottom portion of housing cavity 50b. Alternatively, the induction coil may be positioned in the housing 50a below a bottom of the cavity 50b, allowing the battery 53d in the lidar scanner unit 53 to charge whenever the lidar scanner induction charging apparatus 53c is in close enough proximity to the module housing induction charging apparatus 50c. The module housing induction charging apparatus 50c may be connected to the vehicle 11 to receive power from the vehicle when the vehicle engine is on and (optionally) also when the engine is turned off (for example, from the vehicle battery). This enables the lidar scanner unit battery charging function to be powered by vehicle power whenever possible.

Lidar scanner unit 53 may be configured to be received within the housing cavity 50b. The scanner unit 53 may be configured to be removable from the housing cavity 50b whenever the lidar scanner unit is not in use. The scanner unit 53 may also be configured to be removable from the housing cavity 50b whenever the vehicle 11 is not in use.

The lidar scanner unit 53 may include a scanner unit housing 53a structured to house the various elements of the lidar scanner unit. Lidar scanner unit 53 may be structured to wirelessly communicate with vehicle computing system 14 and entities located remotely from the vehicle 11. For example, a lidar scanner unit communications module 50e may include a wireless vehicle interface 50e-1 and/or other communications interfaces configured to wirelessly communicate with vehicle computing system 14 via vehicle communications interfaces 16. Communications module 50e may also include a cellular or other communications interface 50e-2 configured to enable wireless communications with a remotely located user. Thus, the computing system 14 and/or other vehicle components and systems may receive lidar data and/or images from lidar scanner units 53 via wireless communication. Instructions from computing system 14 may also be conveyed wirelessly to each of lidar scanner units 53 from computing system 14. Also, lidar data and images may be sent to a remotely located user (and commands or instructions may be transmitted from the user to the lidar scanner units 53) via communications interface 50e-2.

Battery 53d may be positioned in the lidar scanner unit housing 53a for powering any functions that may be performed by the lidar scanner unit 53, including scanning to acquire lidar data, lidar data processing, lidar image generation and/or processing, any other data or information processing functions, communications functions such as processing incoming messages and commands and generating messages and commands (such as control commands), motor operation, and other functions.

Induction charging apparatus 53c may be positioned in the lidar scanner unit housing 53a and operatively connected to the battery 53d so as to enable induction charging of the lidar scanner unit 53 whenever the lidar scanner unit is positioned in the module housing cavity 50b, as previously described.

The lidar scanner unit 53 may be structured to be detachable or removable from the module housing cavity 50b whenever the scanner unit is not in use. The lidar scanner unit 53 may be man-portable (i.e., the scanner unit may be extracted from the housing cavity 50b by a single human user and may be carried by a single human user without the assistance of devices).

Lidar scanner unit 53 may include a lidar scanner 53f configured for performing lidar scans of regions of space surrounding the lidar module 53. Lidar scanner 53f may be any type of lidar scanner suitable for the purposes described herein. The scanner 53f may be capable of scanning a full 360° field of view, and may also be controllable to scan pre-programmed and user-selectable portions of the 360° field of view. Acquired scan data may be processed by a scanner unit lidar data processing capability 53g to generate lidar images or for other purposes.

Various methods are available to mechanically operate a laser scanner and an associated receiver field-of-view through a predetermined field of view, with a distance measurement being based on the calculated round trip delay between the emission of a laser light pulse in the direction of an object and the subsequent reception of the received signal. One approach for implementation of the scanning function may be the use of a mechanical steering mirror driven by an actuator to steer the beam and receiver field of view through the desired region. An alternative approach may be to mount the transmitter and receiver on a moving platform such as a multiple-axis gimbal or rotary platform to accomplish the scanning function. The transmitter and receiver can be mounted coaxially or in a parallel co-bore sited configuration depending on the requirements of the system. Other scanner configurations may also be used, provided they are configurable or operable to enable scanning of selected fields of view as described herein.

The lidar scanner unit 53 may include a control module 53e configured to control operation of the scanner unit. In one or more arrangements, the control module 53e may include a lidar scan control capability 53h configured for controlling lidar scanning operations according to a selected scanning mode. For example, in a lidar scanner unit incorporating a mechanically driven mirror and a laser light emitter, the lidar scan control capability 53$h$ may control operation of the emitter and also operation of an actuator driving the mirror, to steer the laser beam and receiver through a programmed field of view. The control module may include a motor control capability 53$x$ configured for controlling a deployment/retraction motor 53$m$ in accordance with the lidar scanner unit operational modes described herein. Other control lidar scanner unit functions may also be incorporated into the control module 53$e$.

Lidar scanner unit 53 may incorporate a lidar data processing capability 53$g$ configured to process lidar scan data to generate lidar images. The lidar data processing capability 53$g$ may also be configured with a comparator capability, to enable comparison between successive lidar images from the same lidar scanner and the same field(s) of view. This may enable the lidar data processing capability 53$g$ to detect differences in lidar images or profiles occurring between successive lidar images. Such differences may indicate undesirable movement or shifting of cargo or even removal of cargo from cargo space 29. The lidar data processing capability 53$g$ may be configured to trigger an alert responsive to such disturbances of cargo, as described herein.

If a lidar scanner output signal may require pre-processing prior to be usable by other element(s) (computing system 14 or a remote user device, for example), the lidar scanner unit 53 may include one or more signal processing means 79 (including, for example, an A/D or D/A converter) to process signals generated by the lidar scanner unit 53 for transmission to the other element(s). If signals received by the lidar scanner unit 53 from another element may require processing prior to use by the lidar scanner unit, the signal processing means 79 may include a processor (for example, an A/D or D/A converter) to process signals received by the lidar module 50.

The lidar scanner unit 53 may be configured so that the various elements of the scanner unit may communicate with each other using a suitably configured bus 53$p$ or the like. Alternatively, any of the elements of the lidar scanner unit may be directly connected to each other without the use of a bus. Also, connections between the elements of the lidar scanner may be through another physical medium (such as wired connections), or the connections may be wireless connections.

Referring to FIGS. 3 and 5A-5C, each of the lidar modules 50 may incorporate a movement mechanism (generally designated 50$m$) configured to move the lidar scanner unit 53 within the module housing cavity 50$b$. For example, the movement mechanism 50$m$ may be configured to extend or deploy the lidar scanner unit 53 from a retracted position within the module housing cavity 50$b$ (as shown in FIGS. 5A and 5B), to a deployed position as shown in FIG. 5C. The movement mechanism may also be configured to retract the lidar scanner unit 53 from the deployed position to a stowed or retracted position as shown in FIGS. 5A and 5B.

In the retracted position, the lidar scanner unit 53 may be recessed within the module housing 50$a$ such that the lidar scanner 53$f$ resides at or below an uppermost surface 50$u$ of the module housing 50$a$ when the scanner unit 53 is in the stowed or retracted position. A cap 53$z$ may be attached to the lidar scanner 53$f$, and may be configured to be flush with the uppermost surface 50$u$ of the module housing 50$a$ when the scanner unit 53 is in the stowed position. The uppermost surface 50$u$ of the module housing 50$a$ may be configured to be flush with an uppermost surface of a cargo space sidewall when the lidar module 50 is installed in the stake pocket.

Any movement mechanism may be employed that is suitable for the purposes described herein. In one or more arrangements, the movement mechanism 50$m$ includes a motor 53$m$ mounted within scanner unit housing 53$a$, a spur gear 171 operatively coupled to a shaft of the motor so as to be rotatable by rotation of the motor shaft, and a complementary rack gear 173 attached to the module housing 50$a$ and positioned within the housing cavity 50$b$ so as to be engageaable by the rotating scanner unit spur gear 171 to move the lidar scanner unit 53 along the housing cavity 50$b$, thereby deploying and retracting the scanner unit 53. As shown in FIGS. 5A-5C, the rack gear 173 may extend parallel to the deployment direction D1 and retraction direction D2 of the lidar scanner unit. The rack gear may 173 be formed integrally with the module housing 50$a$ or the gear 173 may be formed separately and attached using a suitable attachment method (for example, adhesive application). Also, alternative movement mechanisms may be used to move the lidar scanner unit 53 within the module housing 50$a$.

Components of the lidar module 50 may be constructed of plastics, metals, glass, any combination thereof and/or any other suitable materials. For example, surfaces of the lidar scanner unit housing 53$a$ and module housing 50$a$ that are in contact with each other may be formed from a material or materials (such as nylon) having a relatively high lubricity, to minimize the friction caused by movement of the lidar scanner unit within the module housing.

Referring to FIGS. 5A-5C, to raise or deploy the lidar scanner unit 53 from a stowed position (FIGS. 5A, 5B) to a position in which the lidar scanner 53$f$ may scan portions of its surroundings (FIG. 5C), the motor control capability 53$x$ of the control module 53$e$ may send a control signal to the motor 53$m$ causing the motor shaft to rotate the lidar scanner unit spur gear 171. The spur gear 171 meshes or engages with the module housing rack gear 173 in the module housing cavity 50$b$. The motor shaft rotates in a direction which causes the spur gear 171 (and the attached lidar scanner unit 53) to move along the rack gear 173 in a deployment direction (direction D1) of the lidar scanner unit. Lidar scanner unit 53 may move in direction D1 until the lidar scanner is deployed for scanning (FIG. 5C), at which time the motor may stop (through action of a suitably configured limit switch or other mechanism).

When the lidar scanner 53$f$ is no longer required for scanning, the lidar scanner unit 53 may be retracted into the module housing 50$a$. To this end, the motor control capability 53$x$ of the control module 53$e$ may send a control signal to the motor 53$m$ causing the motor shaft to rotate the lidar scanner unit spur gear 171 in a direction opposite the deployment direction. This causes the lidar scanner unit 53 to move in direction D2, retracting the scanner unit 53 into the module housing 50$a$ and into a stowed position as shown in FIGS. 5A and 5B. Engagement between the lidar scanner unit gear 171 and the rack gear 173 may also act to impede theft of the lidar scanner unit because rotation of the gear 171 may be difficult when the motor is turned off. Thus, engagement between the gears 171, 173 may act as a retention mechanism for the lidar scanner unit 53 in the module housing 50$a$.

In one or more arrangements, the lidar scanner unit 53 may be configured to be operable to scan (i.e., acquire scan data relating to) portions of its surroundings and process the acquired data to generate a lidar image in any of at least a first scanning mode, a second scanning mode, and a third scanning mode when the lidar scanner is mounted on the vehicle 11 (for example, residing in a module housing secured within a stake pocket as shown in FIGS. 4A and 4B). In a particular embodiment, the lidar scanner unit 53 may be operable to generate a lidar image of only at least a portion of a cargo space of the vehicle in the first scanning mode. In addition, the lidar scanner unit 53 may be operable to generate a lidar image of only a predetermined volume of space exterior of the vehicle in the second scanning mode. Also, the lidar scanner unit 53 may be operable to generate lidar images of both the at least a portion of the cargo space of the vehicle and the predetermined volume of space exterior of the vehicle in the third scanning mode. Although specific embodiments are described herein with regard to first, second, and third scanning modes having different characteristics, the lidar scanner unit may be configured to implement additional or alternative scanning modes. In one or more arrangements, the lidar scanner unit may be configured to enable a user to select any of the scanning modes the lidar scanner unit is configured to implement.

The lidar scanner fields of view defining the at least a portion of a cargo space of the vehicle and the volume of space exterior of the vehicle to be scanned and imaged may be calibrated or preprogrammed into each individual lidar scanner unit, for example, by a manufacturer of the scanner unit or a vehicle manufacturer. The extent of each field of view may depend on such factors as the configuration of the vehicle into which the lidar scanner unit is to be installed, the location on the vehicle at which the lidar scanner unit is to be positioned, and other pertinent factors. In one or more arrangements, the preprogrammed fields of view may be specified so as to minimize or eliminate effects on the scan data of any cargo area sidewalls and other particular vehicle features outside the regions to be scanned. Alternatively, data relating to these vehicle features may be accounted for and extracted during processing of the lidar data. This may help to eliminate or minimize undesirable effects of such data on lidar image generation and/or image processing.

One example of several pre-programmable lidar scanner unit fields of view is shown in FIG. 4B. FIGS. 4A and 4B show a vehicle in the form of a pickup truck with a cargo space 29 and a pair of sidewalls 11a and 11b. Lidar modules 50-1 and 50-2 are mounted in the sidewall 11a, and lidar modules 50-3 and 50-4 are mounted in the sidewall 11b.

In the arrangement shown in FIGS. 4A-4B, a field of view 50-1A may be defined for lidar scanning unit 53-1 (of lidar module 50-1) including a volume of space exterior of the vehicle 11, and extending between sidewall 11a and a boundary B1 spaced apart from an associated side 11s of the vehicle 11 and out to a radius R1 from the lidar scanner in the lidar scanning unit 53-1. Another field of view 50-1B may also be defined for lidar scanning unit 53-1 including at least a portion of the vehicle cargo space 29 extending between sidewall 11a and a forward wall 29a of the cargo area 29, out to a radius R1 from the lidar scanner in the lidar scanning unit 53-1.

Also, in the arrangement shown, a field of view 50-2A may be defined for lidar scanning unit 53-2 (of lidar module 50-2) including a volume of space exterior of the vehicle 11, extending between sidewall 11a and a tailgate 11c of the vehicle and out to a radius R2 from the lidar scanner in the lidar scanning unit 53-2. Another field of view 50-2B may also be defined for lidar scanning unit 53-2 including at least a portion of the vehicle cargo space 29 extending between sidewall 11a and the tailgate 11c, out to a radius R2 from the lidar scanner in the lidar scanning unit 53-2.

In the arrangement shown, a field of view 50-3A may be defined for lidar scanning unit 53-3 (in lidar module 50-3) including a volume of space exterior of the vehicle 11, extending between sidewall 11b and the tailgate 11c, out to a radius R3 from the lidar scanner in the lidar scanning unit 53-3. Another field of view 50-3B may be also defined for lidar scanning unit 53-3 including at least a portion of the vehicle cargo space 29 extending between sidewall 11b and the tailgate 11c, out to a radius R3 from the lidar scanner in the lidar scanning unit 53-3.

Also, in the arrangement shown, a field of view 50-4A may be defined for lidar scanning unit 53-4 (in lidar module 50-4) including a volume of space exterior of the vehicle 11, extending between sidewall 11b and a boundary B2 spaced apart from a side 11t of the vehicle 11 and out to a radius R4 from the lidar scanner in the lidar scanning unit 53-4. Another field of view 50-4B may be also defined for lidar scanning unit 53-4 including at least a portion of the vehicle cargo space 29 extending between sidewall 11b and the forward wall 29a of the cargo space 29, out to a radius R4 from the lidar scanner in the lidar scanning unit 53-4.

In one or more arrangements, a lidar scanner unit 53 may be configured to generate a lidar image associated with data acquired in any of an associated first scanning mode, second scanning mode, and third scanning mode by scanning only a predetermined field of view relating to a selected one of the first, second, and third scanning modes, to acquire lidar data relating to the selected one of the first, second, and third scanning modes. The lidar data relating to the selected one of the first, second, and third scanning modes is then processed to generate at least one lidar image associated with the selected one of the first, second, and third scanning modes. Thus, in the arrangement of FIG. 4B, for example, lidar scanner unit 53-1 (of lidar module 50-1) may only scan the field of view 50-1B to acquire data relating to a portion of the cargo space 29, and then process the scan data to generate a lidar image associated with the scanned portion of the cargo space. In another example, lidar scanner unit 53-3 (of lidar module 50-3) may only scan the field of view 50-3A to acquire data relating to a volume of space exterior of the vehicle 11, and then process the scan data to generate a lidar image associated with the scanned portion of the vehicle exterior.

In one or more arrangements, the lidar scanner unit 53 may be configured to generate a lidar image associated with data acquired in any of the first scanning mode, the second scanning mode, and the third scanning mode by scanning a 360° degree field of view which includes both at least a portion of the cargo space of the vehicle and a volume of space exterior of the vehicle, to acquire lidar data descriptive of the at least a portion of the cargo space of the vehicle and a volume of space exterior of the vehicle. The lidar scanner unit 53 may then process, from the lidar data descriptive of the at least a portion of the cargo space of the vehicle and the volume of space exterior of the vehicle, only lidar data relating to a selected one of the first, second, and third scanning modes to generate at least one lidar image associated with the selected one of the first, second, and third scanning modes. For example, lidar scanner unit 53-1 may a 360° field of view including both field 50-1B (cargo space) and field 50-1A (exterior of the vehicle) to acquire data relating to both a portion of the cargo space and a volume of space exterior of the vehicle. The lidar scanner unit 53-1 may then process only a selected portion of the scan data (for example, the portion of the data relating to the cargo space). Although scan data may be acquired relating to the entire available field of view of the lidar scanner unit 53-1, only the data relating to a scan mode selected by a user may be processed, to form an associated image of a scan region of interest to the user. Thus, if a user selects a first scanning mode relating to a portion of the cargo space, the lidar data processing capability 53g may only process data relating to the selected mode, thereby providing a lidar image descriptive of the scanned portion of the cargo space.

Figure 6A:
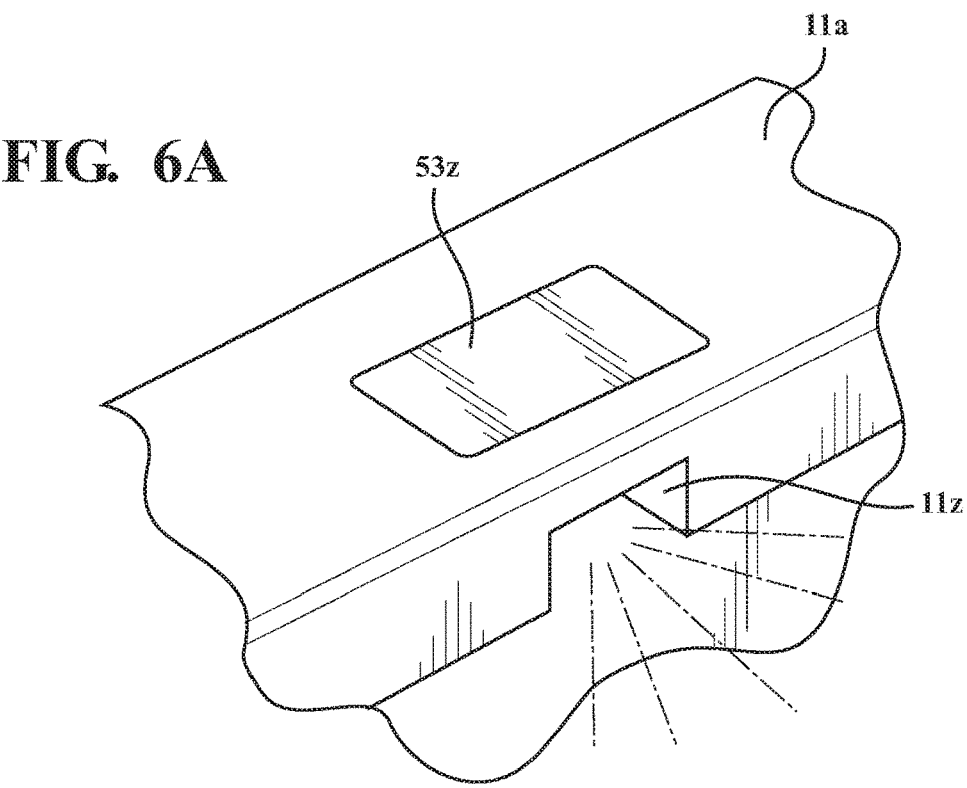
FIG. 6A is a schematic perspective partial view of a portion of a sidewall of a vehicle cargo space, showing an opening formed in the wall adjacent a lidar module to enable lidar scanning of the cargo space when the lidar scanner unit is retracted.
Figure 6B:
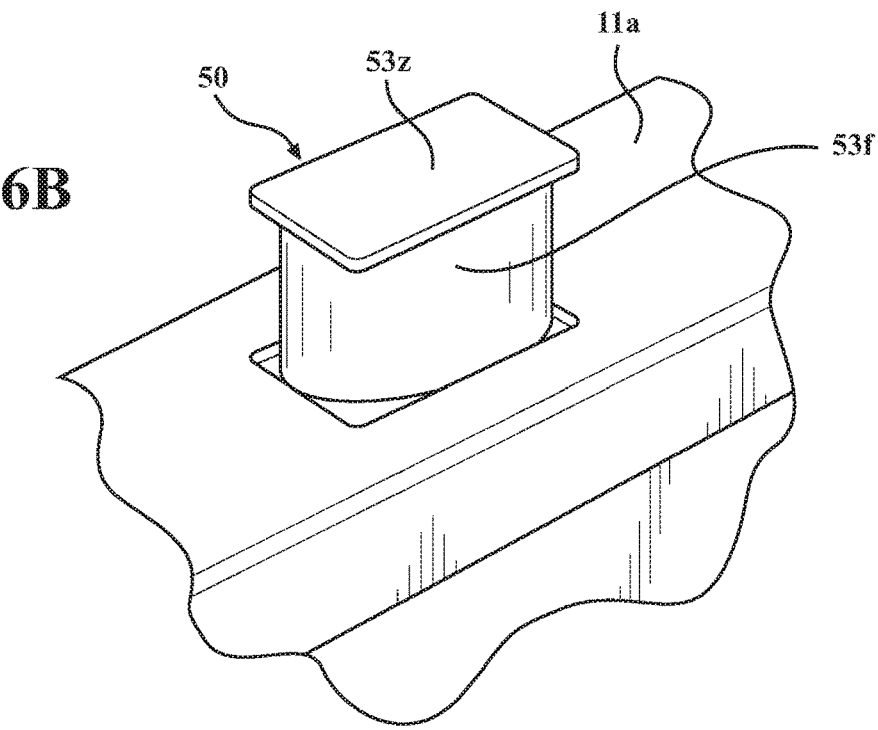
FIG. 6B is a schematic perspective partial view of a portion of a sidewall of a vehicle cargo space, showing a lidar scanner unit extending above the sidewall in the deployed condition of FIG. 5C and ready for scanning.

Referring to FIG. 6A, in one or more arrangements, an opening 11z may be formed in a wall of the vehicle cargo space 29 adjacent any stake pocket containing a lidar module 50. This opening 11z may enable lidar scanning of a portion of the cargo space 29 through an associated opening 50y in the lidar module housing 50a while the associated lidar scanner unit 53 is retracted into its module housing 50a.

Embodiments of lidar modules 50 described herein may be used in any of several operational modes. An operational mode may define a particular set of circumstances or conditions under which the lidar module 50 may be operable.

In a first operational mode, the vehicle 11 may be running (i.e., the engine is turned on) and moving. There may be no cargo in the cargo space 29. In this mode, the lidar scanner units 53 may not scan the cargo space 29, but the units may scan the exterior of the vehicle 11 to acquire information relating to the road surface and vehicle surroundings. Scans of the vehicle exterior may be continuous, and this lidar data and images generated therefrom may be usable to, for example, operate various autonomous driving assistance systems in a known manner. Thus, referring to FIG. 4B, the lidar scanner units 53 may scan fields 50-1A, 50-2A, 50-3A, and 50-4A, but not the cargo area fields 50-1B, 50-2B, 50-3B, and 50-4B.

In a second operational mode, the vehicle 11 may be running (i.e., the engine is turned on) and moving. There may be cargo in the cargo area 29. In this mode, the lidar scanner units 53 may scan both the exterior of the vehicle to acquire information relating to the road surface and vehicle surroundings, and the cargo area 29. Scans of the cargo area and vehicle exterior may be continuous, and the acquired data may be used to generate lidar images usable by the lidar scanning unit 53 and/or the computing system 14. Successive lidar images of the cargo area 29 may be compared in the lidar scanning unit 53 and/or in the computing system 14 to detect movement or shifting of the cargo during the time period between generation of the successive images. When unacceptable shifting of the cargo is detected, a vehicle operator may stop the vehicle to secure and/or rearrange the cargo.

In a third operational mode, the vehicle 11 may be running (i.e., the engine is turned on) and stationary (for example, stopped at a stoplight). There may be cargo in the cargo space 29. In this mode, the lidar scanner units 53 may scan both the exterior of the vehicle to acquire information relating to the road surface and vehicle surroundings, and the cargo space 29. Alternatively, while the vehicle is stopped with the engine running, the lidar scanner units 53 may scan only the cargo space. Scans of the cargo space 29 may be continuous, and the acquired data may be used to generate lidar images usable by the lidar scanning unit 53 and/or the computing system 14. Successive lidar images of the cargo space 29 may be compared in the lidar scanning unit 53 and/or in the computing system 14 to detect movement or shifting of the cargo during the time period between generation of the successive images. Such shifting of the cargo when the vehicle is stopped may indicate, for example, movement of the cargo or attempted theft of the cargo by someone outside the vehicle. While the vehicle engine is turned on, the lidar scanning unit battery 53d may charge through an inductive coupling of the induction charging units 50c and 53c in each of the module housings and associated lidar scanner units.

In a fourth operational mode, the vehicle engine may be turned off and the vehicle may be stationary (for example, parked). There may be cargo in the cargo space 29, and a vehicle user may be remote from the vehicle. The lidar scanner units 53 may operate on internal battery power. The lidar scanner units 53 may scan only the cargo space 29. Scans of the cargo space 29 may be continuous, and the acquired data may be used to generate lidar images usable by the lidar scanning unit 53. Successive lidar images of the cargo space 29 may be compared in the lidar scanning unit 53 to detect movement or shifting of the cargo during the time period between generation of the successive images. Such shifting of the cargo when the vehicle is stopped may indicate, for example, attempted theft or removal of the cargo by someone outside the vehicle.

The lidar scanner modules, computing system, and/or other elements and systems of the vehicle may be configured to implement other or additional operational modes, if desired.

Also, an operational mode may be selectable by a user in which the lidar scanner units will automatically deploy and perform the cargo scans described if cargo is detected in the cargo space, under any of the conditions described. Also, an operational mode may be selectable by a user in which the lidar scanner units will automatically deploy and perform the vehicle exterior scans described if the vehicle engine is running and/or moving.

Any operational mode described herein may be selectable by a user, for example, via the vehicle HMI 109 or by using a suitable alternative human-lidar module-vehicle interface, such as a suitably configured cellular phone or other mobile connection. The user may be a current operator of the vehicle or may be located remotely from the vehicle. A user may also issue commands to the lidar scanner unit through the vehicle HMI 109 or through a cellular interface. For example, the user may deploy and retract any of the lidar scanner units using the vehicle HMI 109 or the cellular interface. The user may activate the lidar modules and associated lidar scanning units via the cellular interface when the user is located remotely from the vehicle and the vehicle is parked and turned off. Although a cellular communications interface a cellular phone are described herein for use by a remote user, any alternative type of remote wireless communications interface(s) and methods could also be used.

Lidar data processing capability 53g may be configured to generate an alert responsive to detected movement of cargo in a cargo space. The alerts may be transmitted to a remote user via a cellular interface 50e-2 of communications module 50e. The alerts may also be transmitted to a vehicle operator (in the occupant compartment of the vehicle) via a vehicle interface 50e-1 of communications module 50e. Alternatively, alerts may be transmitted to the vehicle operator via a wire connected to the lidar scanner unit 53 via a lidar scanner unit connection mechanism as described herein, which enables wired communication between the lidar scanner unit and the computing system 14 and/or other elements of the vehicle using wired interface 50-5e.

A CHMSL or other camera configured to monitor a vehicle cargo area may be configured to be controllable by the computing system 14 to automatically activate if cargo in the camera's field of view is disturbed. An image provided by the camera may be transmitted to a remotely located user, for example, when the vehicle is parked. Alternatively, in one or more arrangements, the camera may be activated and controllable through a cellular or other mobile interface by a remotely-located user responsive to alert signal transmitted to the user by a communications interface located in an associated lidar scanner unit.

Referring to FIGS. 7A-7E, in one or more arrangements, a wired electrical connection may be provided between lidar scanner unit 53 and another portion of the vehicle (such as computing system 14) by use of a scanner unit connection mechanism. The wired connection may include complementary data/command and/or power terminals mounted to the lidar scanner unit 53 and within the module housing cavity 50b so as to be mateable when the lidar scanner unit 53 is retracted into the module housing 50a. The use of wired or wireless connections to the vehicle 11 as described herein provides another way in which lidar modules 50 may be incorporated into the overall vehicle sensor system 28.

Figure 7A:
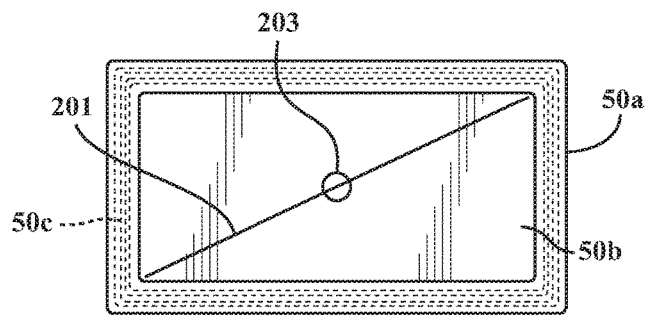
FIG. 7A is a schematic plan view of one embodiment of a portion of a scanner unit connection mechanism positioned in the module housing, with the lidar scanner unit removed from the housing.

FIG. 7A shows a plan view of one embodiment of a portion of a scanner unit connection mechanism positioned in the module housing 50a, with the lidar scanner unit 53 removed from the housing. FIGS. 7B-7E are schematic cross-sectional views illustrating elements and operation of an embodiment of a scanner unit connection mechanism.

In one or more arrangements, the scanner unit connection mechanism may include a frame 201 configured to enable mounting of one or more data/control and/or power terminals 203 thereon. The frame 201 maintains the terminal(s) 203 in positions and orientations which enable the terminal(s) 203 to mate with complementary terminal(s) 205 mounted in an associated lidar scanner unit 53. The frame-mounted terminal(s) 203 and scanner unit-mounted terminal(s) 205 are aligned within the module cavity 50b so that the complementary terminals may be mated and unmated by motion of the lidar scanner unit 53 within the module housing cavity 50b, as described herein.

Frame 201 is structured to be movable along the module housing cavity 50b and to lightly engage the walls of the cavity so as to minimize friction with the module housing 50a, and so as to maintain the terminals 203 mounted on the frame 201 in an upright orientation and in a location within the housing cavity 50b suitable for mating with the scanner unit terminals 205. In the embodiment shown, frame 201 has sufficient depth to prevent undesirable rotation of the frame 201 during motion within the housing. The frame 201 may extend diagonally across the housing cavity 50b to aid in maintaining alignment between the terminals 203, 205 while minimizing the mass of the frame.

In one or more arrangements, a frame-mounted terminal 203 may be a data/command (i.e., signal) terminal or a power terminal. Data/command terminal(s) may enable transfer of lidar images and/or data from the lidar scanner unit 53 to one or more other components of the vehicle 11 (for example, to vehicle computing system 14) for processing, to HMI 109 for display to a vehicle occupant, or to a communications interface for transmission to a remotely located vehicle owner. The data/command terminal(s) may also enable control signals to be sent to the lidar scanner unit 53 from the computing system 14 or (via the HMI) from the vehicle occupant compartment, for purposes of motor control, scanning mode control, etc.

A power terminal may be a terminal adapted for transmission of electrical power to the lidar scanner unit 53, to power the scanner unit during operation and/or to enable charging of the scanner unit battery 53d. A power terminal may enable a battery 53d of the lidar scanner unit 53 to be recharged, and also may enable operation of the lidar scanner unit 53 directly from vehicle power.

The frame-mounted terminal(s) 203 may be connected to one or more suitable electrical transmission lines or wires 207 extending to another portion of the vehicle 10. The various terminals 203, 205 described herein may be mounted in a recess or cavity 209 located in the lidar scanner unit 53, and on a projection 211 extending from a base portion 201a of the frame 201. A data/control terminal mounted on the lidar scanner unit 53 may be configured to mate with a complementary terminal on the frame 201. Similarly, a power terminal mounted on the lidar scanner unit 53 may be configured to mate with a complementary terminal on the frame 201. Wire(s) 207 may be connected to the vehicle using a connector 301 mounted on the lidar scanning unit, and a mating connector 303 connected to a wire 305 leading to computing system, to bus 33, or to another element of the vehicle 11. If desired, suitable EM-shielded terminals, wires and/or connectors may be used to convey the lidar signals, data, and images through the lidar module. EM shielding may also be provided in other portions of the lidar module, if needed.

Frame 201 and/or lidar scanner unit housing 53a may include detent feature(s) 213 configured to increase resistance to unmating of the complementary terminals of the lidar scanner housing 53a and the frame 201. The detent feature(s) 213 may provide additional terminal retention force when the complementary terminals are mated. The detent feature(s) 213 may help resist disconnection of the power and data/control terminals responsive to the unsupported weights of the frame 201 and any wires connected to the frame-mounted terminals 203, during movement of the lidar scanner unit 53 and frame 201 within the module housing 50a.

Figure 7B:
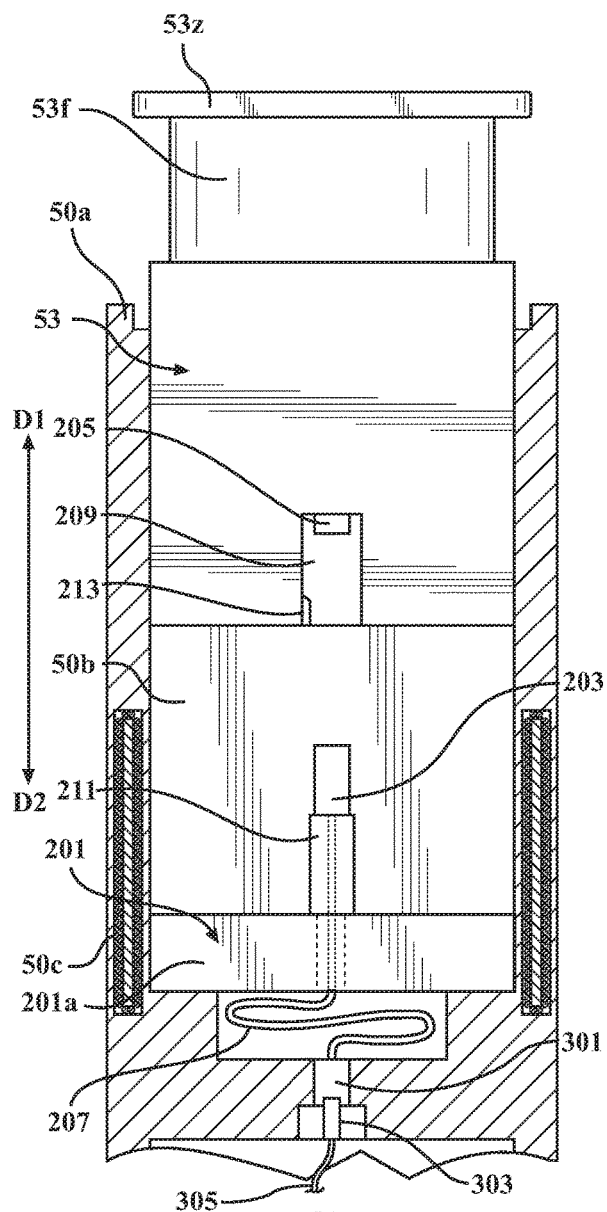
FIG. 7B is a schematic cross-sectional view illustrating insertion of a lidar scanner unit into a module housing prior to engagement between gears of the lidar scanner unit and module housing, and prior to mating of complementary terminals of the lidar scanner unit and module housing of a lidar scanner connection mechanism, in accordance with an embodiment described herein.

As seen in FIGS. 7B-7E, the frame-mounted terminal 203 and the lidar scanner terminal 205 may be engaged by moving the lidar scanner unit 53 into module housing cavity 50B (FIG. 7B). The scanner unit 53 may be moved into the housing cavity 50b until the scanner unit gear 171 engages the module housing rack gear 173, at which time the scanner unit 53 may be retracted further into the module housing 50a by rotation of the spur gear 171, as previously described. The gears 171 and 173 may be configured so that the gears engage prior to the lidar scanner 53f reaching a deployment position above the opening of the module housing 50a. This enables the lidar scanner 53f to be fully deployed by action of the motor and gears alone.

Figure 7C:
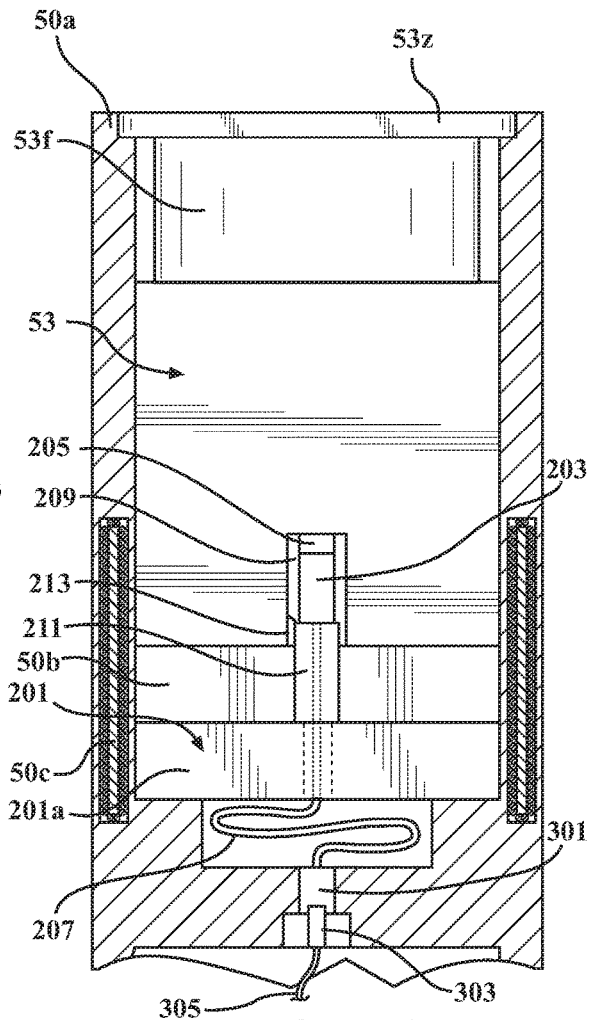
FIG. 7C is the schematic cross-sectional view of FIG. 7B illustrating mating of the complementary terminals of the lidar scanner connection mechanism resulting from movement of the lidar scanner unit in the module housing by the motor and gears of the lidar module.

The scanner unit motor 53m may be actuated to retract scanner unit 53 deeper into the module housing cavity 50b until the force of the detent feature(s) 213 is overcome and the frame-mounted terminal 203 and the scanner unit terminal 205 are mated (FIG. 7C).

As may be seen from FIG. 4B, the desired orientation of the lidar scanner unit 53 within the module housing 50a may be determined by the scanning fields to be covered by the particular lidar scanner unit and the particular stake pocket into which a given lidar scanner unit is to be inserted. The frame 201 residing within a particular module housing and the terminal(s) (or a connector housing the terminal(s)) mounted on the frame may be oriented within the module housing cavity 50 so as to align with the associated complementary terminals of the lidar scanner unit 53 to be positioned in the module housing. This helps ensure mating of power and/or data/command terminals of the lidar scanner unit to associated complementary terminals mounted on the frame 201, when multiple terminals and/or different types of terminals (i.e., both signal and power) are provided.

Figure 7D:
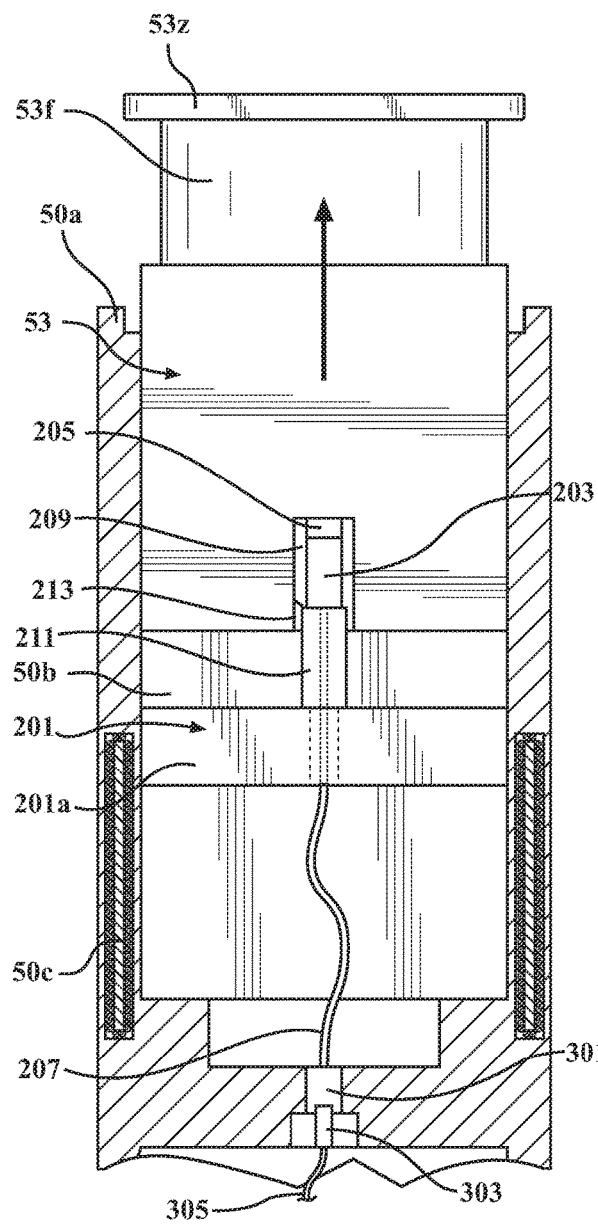
FIG. 7D is the schematic cross-sectional view of FIG. 7B showing upward movement of the lidar scanner unit and the lidar scanner connection mechanism frame in the housing after mating of the complementary terminals.

After the terminals 203, 205 are mated, the lidar scanner unit 53 and the attached frame 201 may be moved between deployed and retracted positions of the lidar scanner unit 53 by the motor and gears, as previously described (FIG. 7D).

One or more hard stops (not shown) may be mounted along the walls of the module housing cavity 50b so as to abut the frame 201 when the frame is moved to a predetermined height within the module housing cavity 50b. The hard stops act to restrict upward movement of the frame 201 in the module housing. This aids in disengaging the electrical contacts 203, 205 prior to removal of the lidar scanner unit 53 from the module housing 50a. The hard stop(s) may be positioned so as to allow movement of the lidar scanning unit 53 to all end-use positions (i.e., deployed and retracted) within the module housing cavity 50b while the terminals 203, 205 are connected.

Figure 7E:
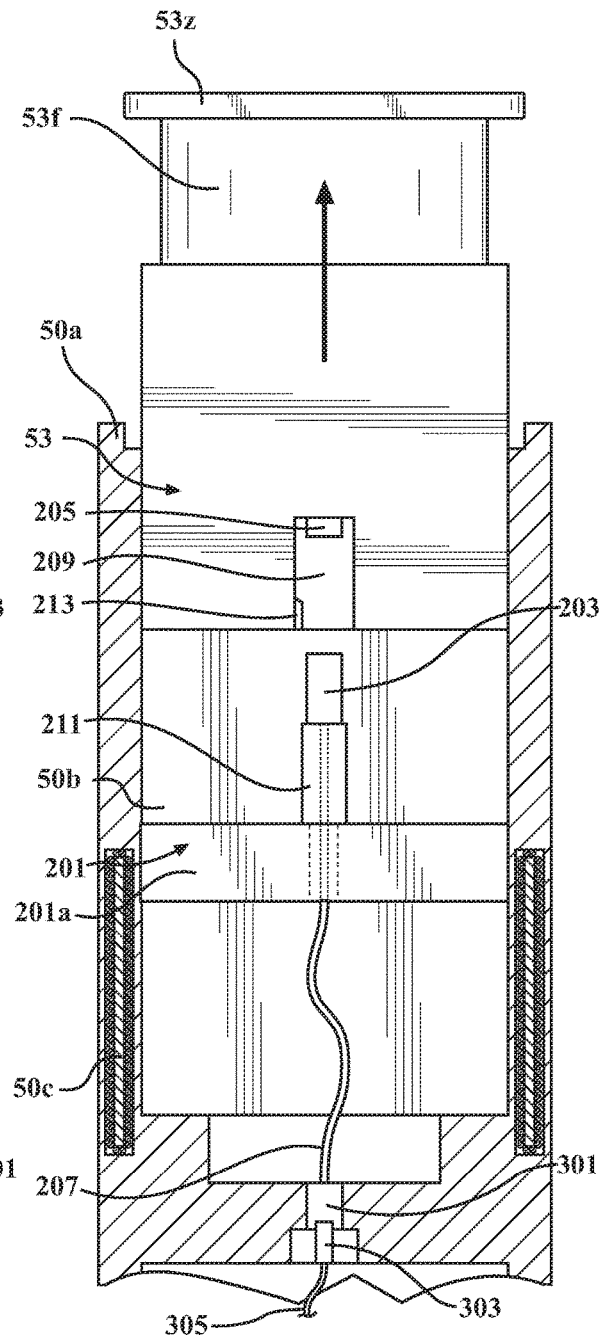
FIG. 7E is the schematic cross-sectional view of FIG. 7D showing disengagement of the complementary terminals of the lidar scanner connection mechanism after travel of the lidar scanner unit a predetermined distance upward within the module housing.

The detent feature(s) 213 and complementary terminals 203, 205 may be configured to be disengageable by operation of the lidar scanner unit motor 53m to move the lidar scanner unit 53 toward the top of module housing cavity 50b. Referring to FIG. 7E, when the lidar scanner unit 53 has moved upwardly a certain distance within the cavity 50b, frame 201 contacts the hard stop(s), which halts upward progress of the frame and prevents further upward motion of the frame. Further upward movement of the lidar scanner unit 53 by the motor causes the detent feature(s) 213 and terminals 203, 205 to disengage, breaking the wired connection between the lidar scanner unit and the vehicle. The motor may be engaged to move the lidar scanner unit 53 upwardly until the gears 171, 172 no longer engage. Then, the lidar scanner unit 53 may be manually from the module housing. After disengagement, the frame 201 falls back to the bottom of the module housing cavity 50b to await subsequent engagement of the complementary terminals.

Referring to FIGS. 3 and 7A-7E, in one or more arrangements, when directly connected to the vehicle 11 using a connection mechanism including a power terminal, lidar scanner unit 53 may be configured to operate directly from power provided by the vehicle engine when the engine is turned on, and/or from vehicle battery power when the engine is on or off. Operation of the lidar scanner unit directly from vehicle power may be effected by connecting a power wire from the vehicle to a suitable connector in a lidar scanner connection mechanism mounted in the module housing, as described herein.

Although a specific embodiment of the lidar scanner unit connection mechanism has been described herein, other forms of connection mechanism may be used.

As will be appreciated by one skilled in the pertinent art upon reading the preceding disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A lidar module configured for mounting on a vehicle, the lidar module comprising:
    a module housing structured to be securable to a vehicle, the module housing defining a cavity configured for receiving a lidar scanner unit therein; and
    a lidar scanner unit configured to be received within the module housing cavity, the lidar scanner unit being configured to be removable from the module housing cavity whenever the lidar scanner unit is not in use.

2. The lidar module of claim 1 wherein the module housing is structured to be mountable in a stake pocket of a pickup truck.

3. The lidar module of claim 1 further comprising a movement mechanism configured to enable movement of the lidar scanner unit within the module housing cavity.

4. The lidar module of claim 3 wherein the movement mechanism comprises a rack gear attached to the housing and positioned within the housing cavity, and a rotatable gear mounted to the lidar scanner unit, the rotatable gear being configured to engage the rack gear in the housing cavity during rotation of the rotatable gear, so as to move the lidar scanner unit along the housing cavity.

5. The lidar module of claim 4 wherein the lidar scanner unit includes a motor operatively coupled to the rotatable gear and configured for rotating the rotatable gear.

6. The lidar module of claim 1 wherein the lidar scanner unit is structured to be removable from the module housing cavity whenever the vehicle is not in use.

7. The lidar module of claim 1 further comprising a lidar scanner unit connection mechanism configured to enable detachable operative electrical connection of the lidar scanner unit to another portion of the vehicle.

8. The lidar module of claim 7 wherein the connection mechanism comprises:
    one or more of a data/command terminal and a power terminal mounted on the lidar scanner unit;
    a frame structured to be movable along the module housing cavity, the frame being structured to support one or more of a data/command terminal and a power terminal in a position suitable for engagement by one or more complementary mating terminals provided in the lidar scanner unit;
    one or more of a data/command terminal and a power terminal mounted on the frame, the one or more of a data/command terminal and a power terminal mounted on the frame being configured for mating contact with the one or more of a data/command terminal and a power terminal mounted on the lidar scanner unit; and
    an electrical transmission line electrically connected to the one or more of the data/command terminal and power terminal mounted on the frame, the electrical transmission line being configured to establish operative electrical connection between the one or more of the data/command terminal and power terminal mounted on the frame and the other portion of the vehicle.

9. The lidar module of claim 8 further comprising a movement mechanism configured to enable movement of the lidar scanner unit within the module housing cavity, so as to move the one or more of a data/command terminal and a power terminal mounted on the lidar scanner unit into mating engagement with the one or more of a data/command terminal and a power terminal mounted on the frame.

10. The lidar module of claim 1 wherein the lidar scanner unit is configured to be operable to generate a lidar image in any of at least a first scanning mode, a second scanning mode, and a third scanning mode when the lidar scanner is mounted on the vehicle, wherein the lidar scanner unit is operable to generate a lidar image of only at least a portion of a cargo space of the vehicle in the first scanning mode, the lidar scanner unit is operable to generate a lidar image of only a volume of space exterior of the vehicle in the second scanning mode, and the lidar scanner unit is operable to generate lidar images of both the at least a portion of the cargo space of the vehicle and the volume of space exterior of the vehicle in the third scanning mode.

11. The lidar scanner unit of claim 10 wherein the lidar scanner unit is configured to enable the scanning mode to be selectable by a human user.

12. A lidar scanner unit configured for mounting on a vehicle, the lidar scanner unit being configured to be operable to generate a lidar image in any of at least a first scanning mode, a second scanning mode, and a third scanning mode when the lidar scanner is mounted on the vehicle, wherein the lidar scanner unit is operable to generate a lidar image of only at least a portion of a cargo space of the vehicle in the first scanning mode, the lidar scanner unit is operable to generate a lidar image of only a volume of space exterior of the vehicle in the second scanning mode, and the lidar scanner unit is operable to generate lidar images of both the at least a portion of the cargo space of the vehicle and the volume of space exterior of the vehicle in the third scanning mode.

13. The lidar scanner unit of claim 12 wherein the lidar scanner unit is configured to enable the scanning mode to be selectable by a human user.

14. The lidar scanner unit of claim 12 wherein the lidar scanner unit is configured to generate the lidar image in any of the at least a first scanning mode, a second scanning mode, and a third scanning mode by:
  scanning only a predetermined field of view relating to a selected one of the at least a first, second, and third scanning modes, to acquire lidar data relating to the selected one of the at least a first, second, and third scanning modes; and
  processing the lidar data relating to the selected one of the first, second, and third scanning modes to generate at least one lidar image associated with the selected one of the at least a first, second, and third scanning modes.

15. The lidar scanner unit of claim 12 wherein the lidar scanner unit is configured to generate the associated lidar image in any of the at least a first scanning mode, a second scanning mode, and a third scanning mode by:
  scanning a 360 degree field of view which includes both the at least a portion of the cargo space of the vehicle and the volume of space exterior of the vehicle, to acquire lidar data descriptive of the at least a portion of the cargo space of the vehicle and the volume of space exterior of the vehicle; and
  processing, from the lidar data descriptive of the at least a portion of the cargo space of the vehicle and the volume of space exterior of the vehicle, only lidar data relating to a selected one of the at least a first, second, and third scanning modes to generate at least one lidar image associated with the selected one of the at least a first, second, and third scanning modes.

16. The lidar scanner unit of claim 12 wherein the lidar scanner unit is structured to be removable from the vehicle whenever the vehicle is not in use.

17. The lidar module of claim 1 further comprising a movement mechanism engageable with the lidar scanner unit to extend the lidar scanner unit from the housing cavity to a predetermined distance past which the lidar scanner unit is disengageable from the movement mechanism to enable the lidar scanner unit to be removed from the housing cavity.

* * * * *